United States Patent [19]
Smith

[11] 3,846,781
[45] Nov. 5, 1974

[54] SLOPE INDICATOR AND ROLL-OVER WARNING INDICATOR FOR EARTHMOVING EQUIPMENT

[76] Inventor: Lawrence S. Smith, Box 155, Wellington, Nev. 89444

[22] Filed: Jan. 10, 1973

[21] Appl. No.: 322,437

[52] U.S. Cl.. 340/267 R, 37/DIG. 19, 116/DIG. 13, 340/282
[51] Int. Cl. .......................................... G08b 21/00
[58] Field of Search .......... 340/267 R, 267 C, 52 H, 340/282; 116/DIG. 13; 37/DIG. 19; 180/104; 33/264, 283, 366

[56] References Cited
UNITED STATES PATENTS

| | | | |
|---|---|---|---|
| 1,411,298 | 4/1922 | Osborn | 340/52 H |
| 2,486,697 | 11/1949 | White | 116/DIG. 13 |
| 2,562,567 | 7/1951 | Moledzky | 340/52 H |
| 2,632,958 | 3/1953 | Masters | 116/DIG. 13 |
| 3,427,724 | 2/1969 | Tracy | 33/283 |

*Primary Examiner*—Glen R. Swann, III
*Attorney, Agent, or Firm*—Owen, Wickersham & Erickson

[57] ABSTRACT

A slope indicator for mounting on earthmoving equipment indicates both the sideslope and the up and down slope on which the equipment is working. The slope indicator includes two transparent housings. Each housing includes a pendulum and a pointer which indicates the slope measurement on scales located in the housings. The sideslope scale includes a portion marked in one color indicating a safe condition and marked in a different color indicating a rollover danger. The transparent walls of the housings permit continuous unobstructed viewing through the housings by the operator. The housings are filled with a viscous fluid for dampening movement of the pendulums. The slope indicator includes a base plate and is connected to the earthmoving equipment by rubber bushings on each side of the base plate. The rubber bushings dampen out substantially all of the vibration from the earthmoving equipment but permit a small amount of vibration to be transmitted to the slope indicator to prevent sticking of the pendulums of the housings. Electrical contacts are associated with the sideslope indicating pendulum for contact with the pendulum when the pendulum swings to a dangerous sideslope indication. When the pendulum contacts either of these electrical contacts, a warning is signalled on the operator's instrument panel of the equipment. The slope indicator includes a tube filled with a colored, non-freezing liquid and having a clear bubble indicator. The tube is slightly curved upwardly, and the length of the tube and the spacing between the sideslope measurement markings associated with the tube are great enough to provide a very accurate indication of the sideslope between zero and 10 percent, the sideslopes most used in road construction. The contrast between the clear air bubble and the colored liquid provides good visibility even in glare light conditions.

13 Claims, 14 Drawing Figures

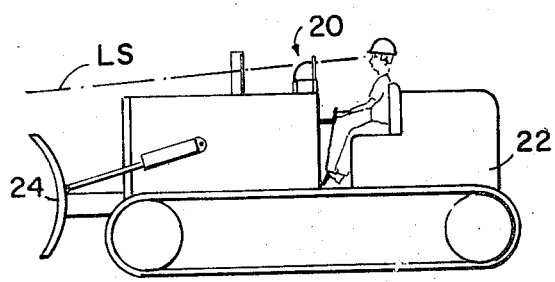
FIG_1
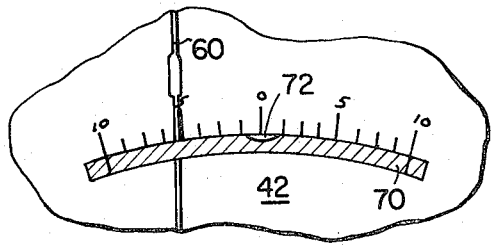
FIG_4
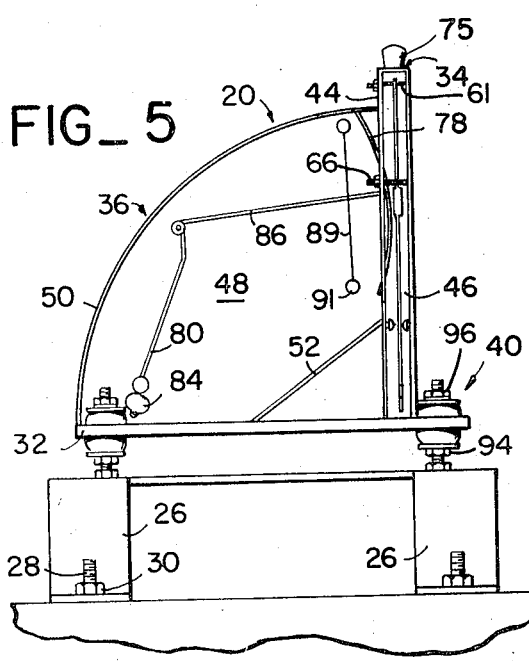
FIG_5
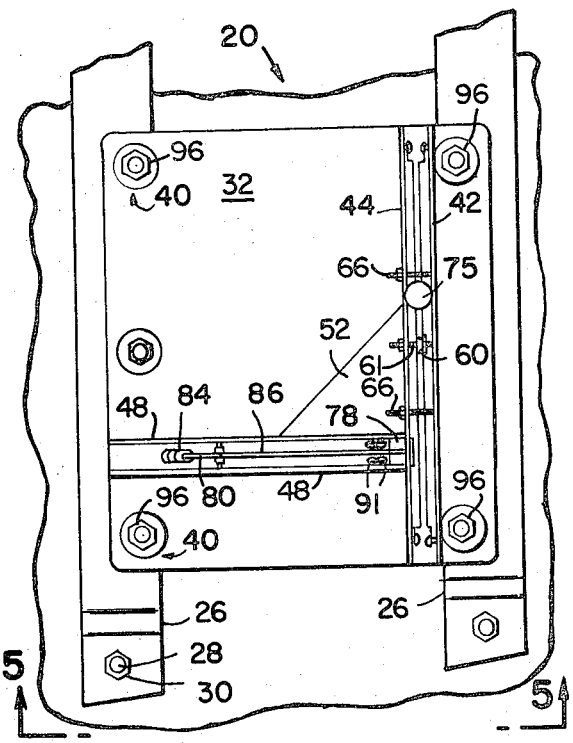
FIG_3
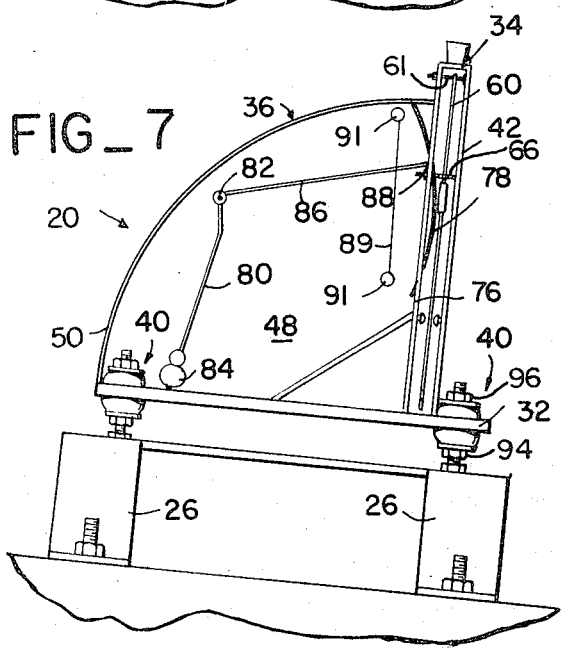
FIG_7
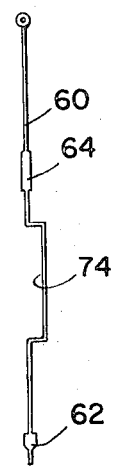
FIG_2

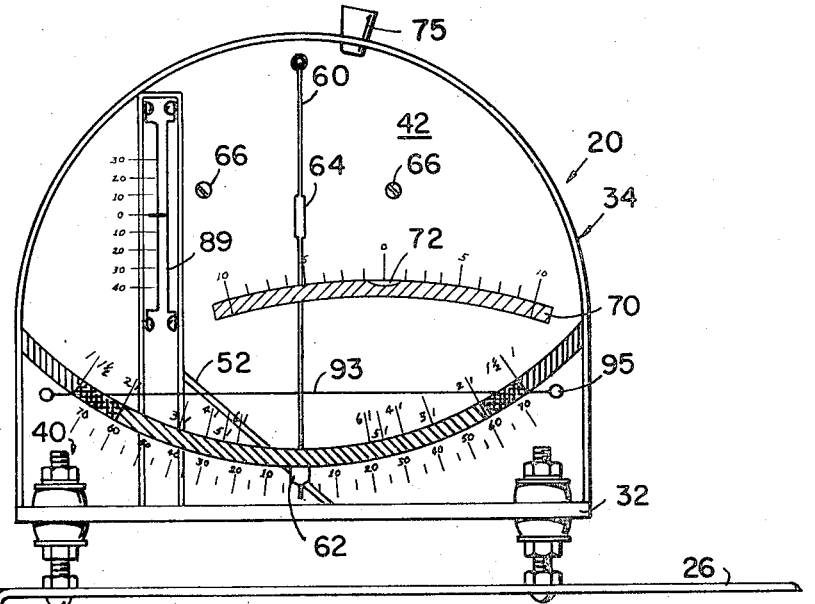
FIG_6
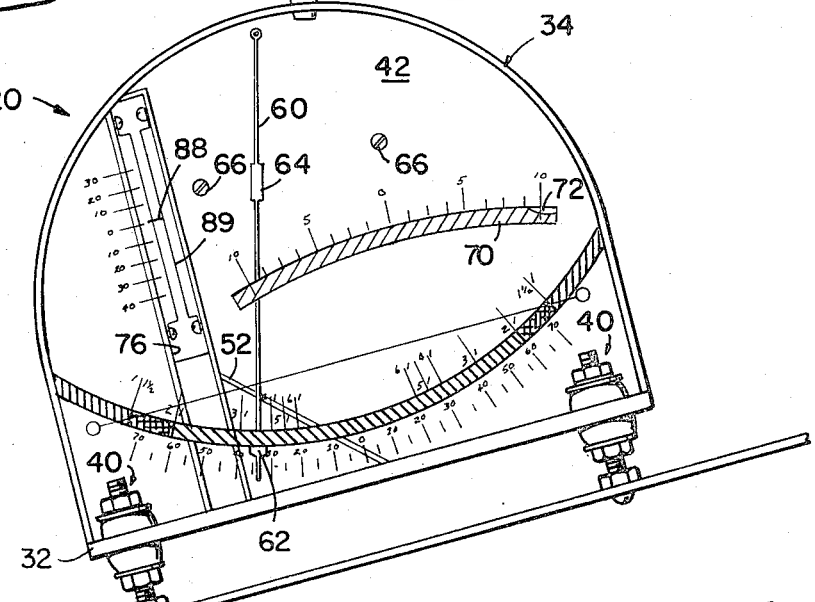
FIG_8

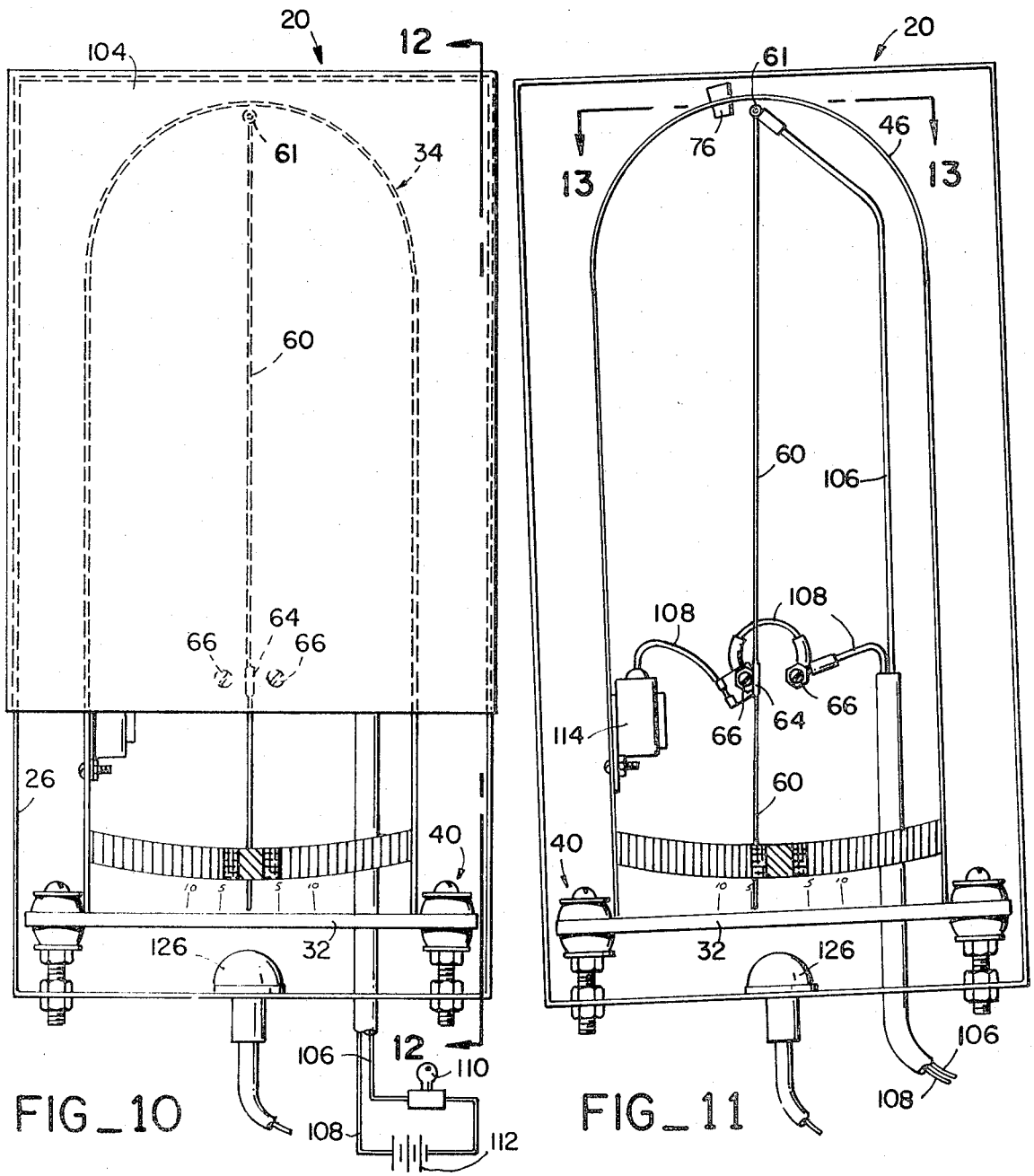

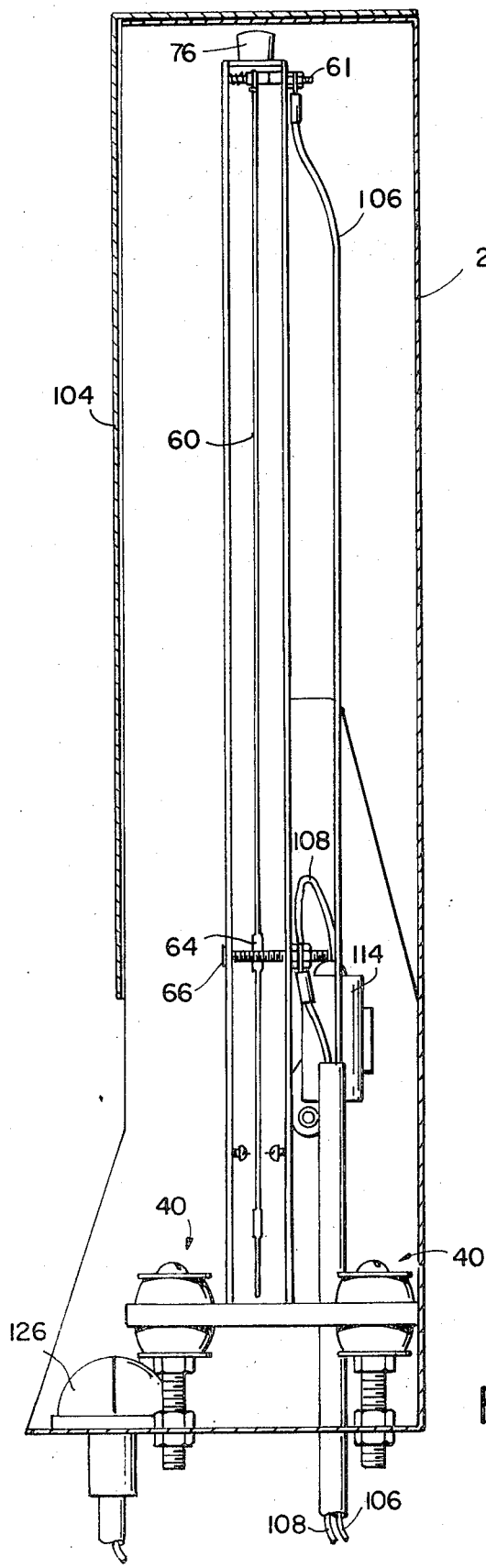
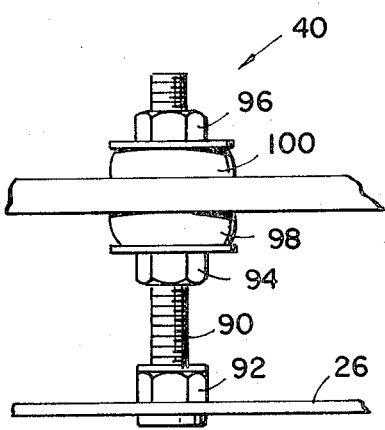
FIG_14
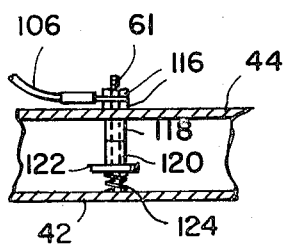
FIG_13
FIG_12

SLOPE INDICATOR AND ROLL-OVER WARNING INDICATOR FOR EARTHMOVING EQUIPMENT

BACKGROUND OF THE INVENTION

This invention relates to a slope indicator for construction equipment. This invention relates particularly to a slope indicator which accurately measures both sideslope and up and down slope and which provides a clearly visible warning when the equipment is operating on a sideslope approaching a dangerous roll-over condition.

In building many roads, particularly secondary and lower grade roads, it is quite useful for the operator of earthmoving equipment, such as a grader or bulldozer, to be able to grade to within 1 percent on a sideslope. This minimizes the number of passes that needs to be made. Roads of this nature are commonly made with a 6 percent–10 percent up and down slope and a 2 percent crown from the center out.

If the slope can be measured with sufficient accuracy directly from the earthmoving equipment, grade stakes and other auxiliary methods of marking the slope can be eliminated.

It has been difficult to obtain the desired accuracy of sideslope measurement with the prior art devices for a number of reasons. A 1 percent change in grade is a relatively small change. For example, one worn tire on a rubber tired tractor can cause a 1 percent change in slope indication. The measurement of such small changes requires an indicator that will first of all measure that change accurately and secondly permit the change to be readily determined from the indicator. The vibration normally produced by the earthmoving equipment compounds the difficulty of determining and readout of such a small change. The up and down slopes (6 percent –10 percent) have often produced problems of sticking or temporary hangup of the sideslope indicators of the prior art.

Roll-over of earthmoving equipment is also a serious problem. Prime movers, such as tractors, sometimes get on sideslopes which are too great and roll over. This can result in injury to the operator and to the equipment and sometimes even in loss of life. The problem of roll-over is more prevalent in the use of towed equipment such as dump wagons. When the bed of the dump wagon is elevated to dump, a large part of the material carried in the dump wagon is elevated to a considerable height, so that the wagon can be turned over on even very slight sideslopes. This can happen very suddenly and quite unexpectly, particularly with inexperienced operators.

SUMMARY OF THE INVENTION

It is a primary object of the present invention to construct a slope indicator which will provide accurate measurements of the sideslope and the up and down slope directly from the earthmoving equipment itself.

It is another important object of the present invention to construct a roll-over warning device which will give clear and adequate warning of an approaching dangerous roll-over condition prior to the time the earthmoving equipment actually gets on a sideslope which will produce roll-over.

It is another object of the present invention to construct a sideslope indicator which will provide an accurate and highly visible measurement of sideslopes between 0 and 10 percent in increments of 1 percent or less under all light conditions, including glare lighting, and under all normal operating conditions including vehicle vibration and large up and down slopes.

It is another important object of the present invention to construct a slope indicator of transparent material that provides a continuous indication of the slope and unobstructed viewing through the slope indicator by the operator at all times.

The slope indicator of the present invention has a first double walled hollow housing and a pendulum mounted for swinging movement within the interior of the housing. The housing is made of transparent material, such as Plexiglass. The bottom part of the housing is marked with sideslope measurement markings in a plurality of laterally extending arcs or bands disposed vertically adjacent to one another. The arcs read in grade ratios and in percent of grade. The arcs or bands include a colored band. One part of the colored band is marked with one color indicating a safe condition, and another part of the band is marked with a second color indicating nearness to a potentially unsafe condition. And a third part of the band is marked with a third color indicating the danger of roll-over. The pendulum includes a pointer which swings along these measurement markings and colored bands to indicate the particular sideslope on which the earthmoving equipment is operating.

The slope indicator includes a second double walled hollow housing connected to the first housing and disposed at right angles to the first housing. A slot in the back face of the first housing interconnects the interiors of the two housings. A second pendulum is mounted for swinging movement in the second housing and includes an arm with a pointer at the end of the arm. The pointer swings along a transparent scale marked with up and down slope measurements.

Both housings contain a viscous fluid for dampening movement of the pendulums.

Both housings are mounted on a transparent base plate. The base plate is connected to the earthmoving equipment by mounting braces and adjustable bolt and nut connectors which permit adjustment and leveling of the slope indicator with respect to the earthmoving equipment.

Guide wires are mounted in each of the hollow housings for maintaining alignment of the pendulums between the walls of the housing. The combination of the viscous fluid and the guide wires prevent sticking and hangup of the pendulums as the earthmoving equipment moves through extremes of sideslopes and up and down slopes.

Rubber bushings are associated with the adjustable connectors. The rubber bushings dampen substantially all of the vibration produced by the earthmoving equipment but do permit a small amount of vibration to be transmitted through to the slope indicator to also prevent problems of sticking or hangup of the pendulums. The rubber bushings also permit the base plate to be made of a clear plastic material which is mountable on the mounting brackets without problems of stress cracking at the points of attachment.

The slope and roll-over indicator includes electrical contacts associated with the sideslope indicating pendulum in a manner such that the pendulum engages one of the contacts when the earthmoving equipment approaches a dangerous roll-over condition. The electrical contacts are in turn connected to a signal, such as a lamp or a buzzer on the operator's dash, which is activated when the pendulum swings into engagement with either one of the electrical contacts.

Slope indicators having the structural features noted above and effective to function in the ways described above constitute further, specific objects of the present invention.

Other objects, advantages and features of my invention will become apparent from the following detailed description of one preferred embodiment taken with the accompanying drawings.

BRIEF DESCRIPTION OF THE DRAWINGS

FIG. 1 is a diagrammatic side elevation view illustrating how a slope indicator constructed in accordance with one embodiment of the present invention is mounted on a track type tractor;

FIG. 2 is a side elevation view of a sideslope indicating pendulum used in a slope indicator constructed in accordance with one embodiment of the present invention;

FIG. 3 is a top plan view of a slope indicator constructed in accordance with one embodiment of the present invention;

FIG. 4 is a fragmentary front elevation view of a sideslope indicating tube incorporated in a slope indicator constructed in accordance with one embodiment of the present invention and illustrated in FIGS. 3, 5, 6, 7 and 8;

FIG. 5 is a side elevation view, taken along the line and in the direction indicated by the arrows 5—5 of the slope indicator shown in FIGS. 3 and 6;

FIG. 6 is a front elevation view of the slope indicator shown in FIGS. 3 and 5;

FIG. 7 is an end elevation view like FIG. 5 but showing the slope indicator with the operative parts in a position assumed on an up slope;

FIG. 8 is a front elevation view like FIG. 6 but showing the slope indicator with the operative parts in the positions assumed on a sideslope;

FIG. 9 is an isometric view showing how a slope indicator constructed in accordance with the second embodiment of the present invention is associated with a towed vehicle for indicating the sideslope of the towed vehicle;

FIG. 10 is a front elevation view of the slope indicator shown in FIG. 9;

FIG. 11 is a front elevation view like FIG. 10 showing the pendulum engaged with an electrical contact to provide a warning when the slope indicator indicates a sideslope which presents the danger of rollover;

FIG. 12 is an end elevation view taken along the line and in the direction indicated by the arrows 12—12 in FIG. 10;

FIG. 13 is a fragmentary detailed cross-section view taken along the line and in the direction indicated by the arrows 13—13 in FIG. 11; and FIG. 14 is a fragmentary enlarged view showing details of the adjustable connecting means for connecting the slope indicators for connecting the slope indicator embodiments of FIGS. 1-8 and FIGS. 9-13 to mounting means on the earthmoving equipment.

DESCRIPTION OF THE PREFERRED EMBODIMENTS

A slope indicator constructed in accordance with one embodiment of the present invention is indicated generally by the reference numeral 20 in FIGS. 1, 3, and 5-8.

The slope indicator 20 is shown mounted on a tractor 22 having a bulldozer blade 24 mounted on the front end of the tractor.

The slope indicator 20 can equally well be used with other types of earthmoving equipment, such as graders. Also, as will be apparent from the description to follow with reference to FIG. 9, the slope indicator has definite utility for use with towed vehicles, such as dump wagons.

In the embodiment shown in FIGS. 1-8 of the drawings, the slope indicator 20 is mounted on the tractor 22 by means of mounting brackets 26. The brackets 26 are bolted directly to the tractor by bolts 28 and nuts 30.

The slope indicator 20 includes a base plate 32 of transparent material, such as Plexiglass.

The base plate 32 is in turn mounted on the brackets 26 by a plurality of adjustable leveling means indicated generally by the reference numeral 40. The construction of these leveling means and the function that these means perform in the overall combination will be described in greater detail below with specific reference to FIG. 14.

The slope indicator 20 includes a first double walled hollow housing 34 and a second double walled hollow housing 36 mounted vertically on the base plate 32 and at right angles to one another.

The double walled hollow housing 34 includes a front wall or plate 42 and a back wall 44. The walls 42 and 44 are connected by an end wall 46, and the end wall 46 is curved to the semicircular shape shown in the drawings in the top part of the housing 34.

Similarly, the second housing 36 includes a pair of sidewalls 48 connected to an end wall 50 which is curved to the quadrant shape shown in the drawings.

The bottoms of the housings 34 and 36 are joined directly to the base plate 32.

An angled brace 52 is connected to the back face 44 of the first housing 34, to one sidewall 48 of the second housing 36 and to the base plate 32 to form a gusset type of brace as illustrated. This adds rigidity to the entire slope indicator 20.

It is an important feature of the present invention that each of the walls of the housings 34 and 36, the base plate 32, and the brace 52 are made of transparent material. This permits the slope markings, both sideslope and up and down slope to be easily seen and continuously determined by the operator. The transparent housings also do not present any obstruction to the operator's view through the slope indicator. Thus, the operator is able to look through the slope indicator 20 along the line of sight indicated by the line LS in FIG. 1.

As best shown in FIGS. 6 and 8, the plate 42 has sideslope measurement markings located along a lower part of the plate in a series of generally horizontally extending arcs which are closely spaced vertically. The top arc gives the slope in ratios reading from 1½ to 1 to 6 to 1.

Immediately below these slope markings there is a band which has different colors to indicate safe and unsafe sideslopes. Thus, the center part of this arc is colored green (as shown in the drawings) to indicate that the earthmoving equipment is on a safe sideslope when the sideslope is less than about 60 percent. This arc is marked with a yellow color for sideslopes from 2 to 1 to 1½ to 1 to indicate that the operator should exert caution when the earthmoving equipment (the tractor 22 in this case) is on sideslopes in this range. This band is marked with red, as illustrated, for sideslopes greater than 1½ to 1 to warn the operator not to get the earthmoving equipment onto slopes in this range because such slopes present the danger of roll-over. The relative extent of the green, yellow and red markings will vary with different kinds of earthmoving equipment.

The lower most arc is inscribed with markings indicating the percent of the sideslope.

A pendulum 60 is mounted on a pivot 61 for swinging movement within the interior of the first housing 34 and includes a weighted pointer 62 which swings along the scales of the sideslope measurement markings to indicate the sideslope on which the earthmoving equipment is operating. The weighted pointer 62 may preferably be made of brass.

A sleeve 64, which may be made of copper, is mounted on the pendulum 60 in the upper part of the pendulum. The purpose of this sleeve 64 is to contact bolts 66 when the earthmoving equipment gets on a sideslope which will cause the pendulum to swing to these extreme angles. The sleeve 64 adds reinforcement to the pendulum and prevents damage to the relatively fragile pendulum needle in such situations. The sleeve also provides good electrical contact for producing a warning signal, as will be described in greater detail below with reference to FIG. 11.

In road construction the majority of the sideslopes that need to be determined lie within the range of 0 to 10 percent. It is desirable to be able to measure the sideslope quite accurately (within less than 1 percent) directly from the earthmoving equipment since this eliminates the need for stakes and minimizes the number of passes that are required to produce the desired sideslope.

The pendulum arrangement thus far described will produce the desired accuracy if the housing 34 and pendulum 60 are made sufficiently large to produce the necessary increments in spacing between the percent markings on the bottom arc. Thus, a pendulum having a length of ten inches or more will accurately read sideslope changes of less than 1 percent.

It is an important feature of the present invention that additional means for measuring small changes in sideslopes may be included in the slope indicator 20.

As best illustrated in FIG. 4, a tube 70 is mounted within the housing 34 behind the front wall or plate 42 and has a slight upward curvature at the center part of the tube. The tube 70 is filled with a colored liquid, such as the brown liquid indicated in FIG. 4, except for a clear indicating bubble 72. Sideslope measurement markings of 0 to 10 percent are inscribed on the plate 42 or are otherwise suitably associated with the tube 70, and the indicating bubble 72 slides beneath the markings to indicate the percent of the sideslope on which the earthmoving equipment is operating. The tube is long enough and the distance between the percent markings is great enough that changes in sideslope of less than 1 percent can be determined with great accuracy. Thus, a 5 inch piece of ¼ inch diameter Plexiglass with a non-freezing colored fluid and a suitable curvature of the tube 70 will provide all of the accuracy that is required.

The contrast between the clear indicating bubble 72 and the colored liquid in the tube 70 provides good visibility of the sideslope reading under all conditions of lighting, including glare lighting.

The pendulum 60 is formed with a U-shaped portion 74 to permit the pendulum to swing behind the tube 70 without contacting the tube.

The interior of the housing 34 is filled with a viscous fluid, such as castor oil, to dampen the movement of the pendulum needle 60.

The fluid is added through an opening in the top of the housing. This opening is closed by a rubber plug 75 after the fluid has been added.

The interior of the second housing 36 is connected to the interior of the housing 34 by a slot 76 formed in the back face or wall 44 of the first housing. Fluid thus flows freely from the first housing into the second housing to fill both housings when it is added through the opening at the top of the first housing.

A curved clear plexiglass strip 78 is mounted between the sidewalls 48 of the second housing and projects part way into the first housing 34 through the slot 76. This strip 78 is marked with up and down slope measurement markings as best illustrated in FIG. 8.

The second pendulum 80 is mounted on a pivot 82 within the interior of the second housing 36. The pendulum 80 has a weight 84 at the lower end.

An arm 86 extends generally horizontally from the pivot 82 and is connected to the pendulum at a fixed angle. This angle illustrated may be changed to adapt the up and down slope indicator to different types of equipment. The arm 86 includes a pointer 88. This pointer moves along the scale on the strip 78 with changes in up and down slope to indicate the slope on which the earthmoving equipment is operating. The pointer 88 may be in the form of a short horizontal bar as best illustrated in FIG. 8. The up and down slope measurement marking is therefore clearly visible through the transparent front plate 42 of the slope indicator.

A pair of thin wires 89 are strung between a pair of pins 91 to provide guide means for retaining the pointer 86 in horizontal alignment with the scale on the strip 78.

Similarly, a pair of guide wires 93 are strung between a pair of pins 95 to provide guide means for retaining the lower end of the pendulum 60 in alignment between the front and back walls of the housing 34.

The combination of the viscous fluid and the guide wires permit the sideslope pendulum to swing freely without sticking on a down grade or up grade in excess of 10 percent. This kind of down grade or up grade could otherwise cause the pendulum to rub against the walls and stop the pendulum from swinging.

As best shown in FIG. 14, the leveling means 40 include a bolt 90, nuts 92, 94, 96, and resilient bushings 98 and 100.

Each of the bolts 90 is securely attached to the brackets 26 by means of the nuts 92. The base plate 32 can then be positioned at the proper angle on the mounting brackets 26 to provide the proper sideslope and proper up and down slope indication for the slopes on which the earthmoving equipment is setting. For calibration purposes it is preferable to have the earthmoving equipment on a zero sideslope and a zero up and down slope. The leveling means 40 are then adjusted to position the sideslope indicating pendulum 60 on the zero sideslope marking and to position the up and down slope indicator 88 on the zero up and down slope measurement marking.

The nuts 94 and 96 are then tightened to retain the base plate 32 at the proper angular position.

The bushings 98 and 100 serve an important purpose. These bushings, which may be rubber, dampen most of the earthmoving equipment vibration. This does two things. It minimizes vibration and unsteadiness of the indicator pendulums. It also permits the base plate 32 to be made of a transparent material such as Plexiglass without cracking at the bolt hole since stresses are not transmitted directly to the base plate.

The bushings 98 and 100 do permit a small amount of vibration to be transmitted through the leveling means, and this has the advantage of minimizing hangup or sticking of the pendulums 60 and 80.

Another important feature of the present invention is that the slope indicator provides a warning signal when a dangerous roll-over condition is near. This is important, of course, in case of prime movers since it protects the equipment and the operator. It also has significant utility in case of towed vehicles where the range of sideslopes on which the towed vehicle can be operated without danger is often much more restricted than in the case of prime movers.

Thus, with a dump wagon 102 as illustrated in FIG. 9, in which the bed of heavy material must be elevated to a substantial height to produce dumping, only a very small range of sideslopes can be utilized with safety. As the heavy bed of material of the dump truck 102 is elevated, the moment which can cause turnover is greatly increased over that which exists when the bed is flat.

In FIGS. 9–12 the slope indicator 20 is shown in a construction in which only sideslopes are indicated. The mounting means 26 in this case comprise a metal case as illustrated in FIG. 9, and the leveling means 40 adjust the level as indicated above with reference to FIGS. 1–8.

A metal cover 104 may also be used to cover the top part of the slope indicator. Only the lower sideslope indicating scale needs to be seen. Thus, a tall slope indicator 20 having a long pendulum is used to provide good accuracy and easy reading of very small changes in slope, and the cover 104 serves to protect the upper part of the slope indicator against rocks and other objects that might be kicked up during the course of operation of the earthmoving equipment.

The scale gives a visual colored indication of the sideslope (as in the embodiment described above with reference to FIGS. 3–8). Green indicates a safe condition. Yellow indicates a caution condition. And red indicates roll-over danger.

A pair of wires 106 and 108 are connected to the bolts 66 and the pendulum 60, respectively. A warning light 110 is mounted on the instrument panel of the tractor 22, and a battery 112 causes the light 110 to come on when the sleeve 64 of the pendulum contacts either of the bolts 66. The condensor 114 may be connected to the wire 108 to prevent arcing between the sleeve 64 and the bolts 66.

As illustrated in FIG. 13, the wire 106 is clamped between a pair of nuts 116 on the pivot bolt 61 on the outside of the back wall 44. A copper spacer 118 is directly connected to the bolt 64 on the inside of the housing 34. A bronze bushing 120 is part of the pendulum 60 and rotates on the pivot bolt 61. A flat washer 122 is pressed against the bushing 120 by a coil spring 124 to ensure electrical contact between the pendulum 60 and the spacer 118, and thus the bolt 61 and wire 106.

A bulb 126 may be mounted in the housing 26 to light up the sideslope indicator scale.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A slope indicator for mounting on earthmoving equipment to indicate the slope on which the equipment is working, said slope indicator comprising, a double walled, hollow housing having a front plate with sideslope measurement markings located along a lower part of the plate, said plate being transparent in at least the portion having said sideslope measurement markings, mounting means for mounting the housing on earthmoving equipment, pendulum means mounted for swinging movement within the interior of the housing, said pendulum means including a pendulum and a pointer for indicating the marking corresponding to the sideslope on which the earthmoving equipment is working, said pendulum means including pivot means connecting the top of the pendulum behind the front plate to a top part of the plate whereby the sideslope is continuously indicated by the pointer behind the measurement markings of the front plate, a viscous fluid within the housing for dampening movement of the pendulum, leveling means for leveling the slope indicator on the earthmoving equipment, and including cushioning means in the leveling means for absorbing a substantial part of the earthmoving equipment vibration while letting some of the vibration through to prevent sticking of the pendulum within the double walled housing.

2. The invention defined in claim 1 wherein the cushioning means include rubber bushings engaged with the top and bottom sides of the base plate.

3. A slope indicator for mounting on earthmoving equipment to indicate the slope on which the equipment is working, said slope indicator comprising, a double walled, hollow housing having a front plate with sideslope measurement markings located along a lower part of the plate, said plate being transparent in at least the portion having said sideslope measurement markings, mounting means for mounting the housing on earthmoving equipment, pendulum means mounted for swinging movement within the interior of the housing, said pendulum means including a pendulum and a pointer for indicating the marking corresponding to the sideslope on which the earthmoving equipment is working, said pendulum means including pivot means connecting the top of the pendulum behind the front plate to a top part of the plate whereby the sideslope is continuously indicated by the pointer behind the measurement markings of the front plate, a viscous fluid within the housing for dampening movement of the pendulum, and wherein the front wall and the rear wall of the double walled housing are transparent and including a slot in the back wall of the double walled housing, a second double walled hollow housing mounted at right angles to the first double walled hollow housing and connected to the interior of the first housing through the slot so that the viscous fluid in the first housing flows freely into the interior of the second housing, up and down slope scale means at said slot so as to be visible through the front plate of the first housing, said up and down slope scale means having up and down slope measurement markings, and second pendulum means for indicating the up and down slope, said second pendulum means including a second pendulum and second pivot means connecting the top of the second pendulum within the interior of the second housing near the top and at the back of the housing, said second pendulum including a generally horizontally extending arm with a pointer at the end for alignment with a particular up and down slope measurement marking on the up and down slope scale.

4. The invention defined in claim 3, wherein the walls of the second housing are all transparent to permit continuous unobstructed viewing through the slope indicator by the operator of the equipment.

5. The invention defined in claim 3 including a thin piece of clear plastic mounted between the sidewalls of the second housing in the slot in the back face of the first housing, said thin piece of plexiglass being curved to the radius of the generally horizontally extending arm on said second pivot means and wherein the up and down slope measurement markings are inscribed in percentages on said thin curved piece of plexiglass.

6. The invention defined in claim 3 including guide means for holding the arm and pointer in vertical alignment between the sidewalls of the second housing.

7. The invention defined in claim 6 wherein said guide means include a pair of wires on the inside of the second housing near the front end of the housing.

8. The invention defined in claim 3, including fill means at the top of the first housing for adding viscous fluid to both of the housings.

9. The invention defined in claim 3, including a base plate on which both of the first and second housings are mounted and including a transparent brace connected to said base plate and to each of the housings for providing rigidity without obstructing the operator's view.

10. A slope indicator for mounting on earthmoving equipment to indicate the slope on which the equipment is working, said slope indicator comprising, a double walled, hollow housing having front and rear walls, said front wall comprising a front plate with sideslope measurement markings located along a lower part of the plate, said plate being transparent in at least the portion having said sideslope measurement markings, mounting means for mounting the housing on earthmoving equipment, pendulum means mounted for swinging movement within the interior of the housing, said pendulum means including a pendulum and a pointer for indicating the marking corresponding to the sideslope on which the earthmoving equipment is working, said pendulum means including pivot means connecting the top of the pendulum behind the front plate to a top part of the plate whereby the sideslope is continuously indicated by the pointer behind the measurement markings of the front plate, a viscous fluid within the housing for dampening movement of the pendulum, guide means for holding the lower end of the pendulum in alignment between the front and rear walls of the hollow housing, and wherein said guide means include horizontally extending wires across the width of the hollow housing.

11. A slope indicator for mounting on earthmoving equipment to indicate the slope on which the equipment is working, said slope indicator comprising, a double walled, hollow housing having a front plate with sideslope measurement markings located along a lower part of the plate, said plate being transparent in at least the portion having said sideslope measurement markings, mounting means for mounting the housing on earthmoving equipment, pendulum means mounted for swinging movement within the interior of the housing, said pendulum means including a pendulum and a pointer for indicating the marking corresponding to the sideslope on which the earthmoving equipment is working, said pendulum means including pivot means connecting the top of the pendulum behind the front plate to a top part of the plate whereby the sideslope is continuously indicated by the pointer behind the measurement markings of the front plate, a viscous fluid within the housing for dampening movement of the pendulum, and wherein the front wall and the rear wall of the double walled housing are transparent and including a tube mounted on said housing and extending laterally across a part of the face of the housing, said tube having a slight upward curvature and being filled with a colored liquid except for a clear air bubble indicator, sideslope measurement markings in increments of one percent or less associated with said tube so that said air bubble slides beneath the markings to indicate the sideslope on which the earthmoving equipment is operating and wherein the length of the tube and the spacing between the markings provide a very accurate and easily readable indication of the sideslope between zero and ten percent grade, and wherein the contrast between the clear bubble and the colored liquid provides good visibility even in glare lighting conditions.

12. The invention defined in claim 11 wherein the tube is mounted inside the first hollow housing and wherein the pendulum has a generally U-shaped portion for movement along the length of the tube without contacting the tube.

13. A slope indicator for mounting on earthmoving equipment to indicate the slope on which the equipment is working, said slope indicator comprising, a tube having a slight upward curvature and filled with colored fluid except for a clear air bubble, sideslope measurement markings located along the length of the tube, mounting means for mounting the tube on earthmoving equipment, and leveling means for leveling the tube on the earthmoving equipment, and wherein the length of the tube and the spacings between the markings is great enough to permit a very accurate measurement of sideslope grades between zero and 10% and wherein the contrast between the clear air bubble and the colored fluid permit good visibility of the sideslope measurement even under glare lighting conditions.

* * * * *